(12) United States Patent
Qing et al.

(10) Patent No.: US 7,672,313 B2
(45) Date of Patent: Mar. 2, 2010

(54) METHOD FOR REALIZING ROUTE FORWARDING IN NETWORK

(75) Inventors: Wu Qing, Guangdong (CN); Jiandong Ge, Guangdong (CN); Guoping Li, Guangdong (CN); Jianzhong Huang, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 470 days.

(21) Appl. No.: 11/634,941

(22) Filed: Dec. 7, 2006

(65) Prior Publication Data

US 2007/0133568 A1    Jun. 14, 2007

Related U.S. Application Data

(63) Continuation of application No. PCT/CN2004/000613, filed on Jun. 7, 2004.

(51) Int. Cl.
*H04L 12/28* (2006.01)
(52) U.S. Cl. .................... 370/395.5; 370/401
(58) Field of Classification Search .............. None
See application file for complete search history.

(56) References Cited

U.S. PATENT DOCUMENTS

| | | | | |
|---|---|---|---|---|
| 7,082,102 | B1 * | 7/2006 | Wright | 370/229 |
| 7,406,031 | B1 * | 7/2008 | Swallow | 370/217 |
| 7,480,253 | B1 * | 1/2009 | Allan | 370/252 |
| 7,512,702 | B1 * | 3/2009 | Srivastava et al. | 709/238 |
| 2002/0093954 | A1 * | 7/2002 | Weil et al. | 370/389 |
| 2003/0002444 | A1 | 1/2003 | Shin et al. | |
| 2003/0043745 | A1 | 3/2003 | Kano et al. | |

FOREIGN PATENT DOCUMENTS

| CN | 1412985 | 4/2003 |
|---|---|---|
| JP | 2002-354020 A | 12/2002 |
| JP | 2003-134148 A | 5/2003 |

OTHER PUBLICATIONS

Defeng Li Huawei Technologies: "QoS-guaranteed MPLS-based NBVPN with centralized resource controller; draft-defent-13vpn-qos-crs-00.txt" IETF Standard-Working-Draft, Internet Engineering Task Force, IETF, CH, Feb. 1, 2004; XP015012376 ISSN: 0000-0004 (the whole document) (claims 1-8).

Defeng Li Huawei Technologies Co et al.: "Architecture of QoS-guaranteed MPLS-based NBVPN with centralized resource controller: D 499"; ITU-T Draft Study Period 2001-2004, International Telecommunication Union, Geneva; CH, vol. Study Group 13, Feb. 3, 2004, pp. 1-11, XP017416622 (the whole document) (claims 1-8).

(Continued)

*Primary Examiner*—Hong Cho
*Assistant Examiner*—Eunsook Choi
(74) *Attorney, Agent, or Firm*—Darby & Darby P.C.

(57) ABSTRACT

A method for realizing route forwarding in a network, including: establishing LSPs in a bearer network; setting an entrance label in the starting node of each LSP pointing to forwarding information of the LSP; a bearer control entity assigning a transfer path for the service flow and sending the information of all corresponding entrance labels of the transfer path to the ingress edge node of the transfer path; when the service flow needs to be forwarded, the ingress edge node puts the label stack into the data packet of the service flow to generate an MPLS exchange packet; and forwarding the MPLS exchange packet in the bearer network according to the label stack until the packet reaches the egress edge node of the transfer path. The present invention grants high compatibility to the network, minimizes the network investment, and reduces the difficulties in network implementation.

7 Claims, 6 Drawing Sheets

OTHER PUBLICATIONS

Rosen Cisco Systems E et al.: "Multiprotocol Label Switching Architecture; rfc 3031.txt" IETF Standard, Internet Engineering Task Force, IETF, CH, Jan. 1, 2001, XP015008814 ISSN: 0000-0003 (paragraph [3.10]—paragraphs [3.11](claims 3-8).

* cited by examiner

METHOD FOR REALIZING ROUTE FORWARDING IN NETWORK

CROSS-REFERENCE TO RELATED APPLICATIONS

This is a continuation of International Application No. PCT/CN2004/000613, filed on Jun. 7, 2004, now published as WO 2005/122493, published date Dec. 22, 2005, which designated the United States; the disclosure of which is hereby incorporated by reference in its entirety.

FIELD OF THE INVENTION

The present invention relates to network routing techniques, and particularly, to a method for realizing route forwarding in a network.

BACKGROUND OF THE INVENTION

Along with the continuous growth of the Internet, various network services come forth one after another, and various advanced multimedia systems emerge endlessly, which makes the Internet frequently process various multimedia services, such as File Transfer Protocol (FTP) service that is highly sporadic, and Hypertext Transfer Protocol (HTTP) service containing image files. As real-time services in networks are sensitive to network characteristics including transfer delay and delay jitter, the quality of the real-time services will be affected while the network is processing such multimedia services as FTP and HTTP services. Moreover, multimedia services always occupy much bandwidth, so that enough bandwidth couldn't be provided continuously for transferring key services reliably.

To solve the above problems, various Quality of Service (QoS) technologies have been brought forth. For instance, Internet Engineering Task Force (IETF) has established many service models and mechanisms to meet the demands of networks. Among the QoS technologies, the most recognized technical solution is to adopt the Integrated Services (Int-Serv) model at the access and edge of the network and adopt the Differentiated Services (Diff-Serv) model at the core of the network. As QoS is guaranteed only by setting priority levels in the Diff-Serv model adopted to the solution, it is hard to guarantee the transfer reliability and transfer quality in the network in spite of the high efficiency of utilizing the lines.

To solve the problem, an independent bearer control layer is introduced into the prior Diff-Serv model. An improved Diff-Serv model is brought forward to take the place of the prior Diff-Serv model, with an independent bearer control layer and a set of corresponding Diff-Serv QoS signaling mechanism. For example, to promote the application of the Diff-Serv, a Bandwidth Broker (BB) model is used to realize management of network resources and topology in the QBone Experimental Network jointly promoted by IETF, manufacturers and research institutes. Besides, some other manufacturers have brought forward some similar techniques of QoS server/resource manager to manage the topology and resources and coordinate QoS capabilities in different Diff-Serv domains.

A Diff-Serv model with the independent bearer control layer is illustrated in FIG. 1. The bearer control layer in this model consists of several bearer network resource managers (CMs), which can be Bandwidth Brokers, QoS servers, or other network devices. While processing a service bandwidth request from a user, the bearer control layer needs to designate the path of the user service, then a CM will instruct an edge router (E) to establish a Label Switching Path (LSP) according to the designated path and the service flow is forwarded through this LSP.

The route forwarding solution in the prior art for the bearer network to forward service flow through the path specified by the bearer control layer mainly includes: establishing a LSP by means of resource reservation according to the Multiple Protocol Label Switching (MPLS) technology along the path of service flow specified by the bearer control layer, then conducting route forwarding through the LSP. In other words, the bearer network needs to reserve bandwidth according to the explicit route mechanism of MPLS to establish an end-to-end LSP, and then conduct route forwarding through the LSP. The signaling protocol provided by the explicit route mechanism of MPLS can be RSVP-TE or CR-LDP.

A typical route forwarding solution is hereinafter described in detail. The established LSP in accordance with the solution is illustrated in FIG. 2. The detailed description of the steps of this solution is as follows:

Step A: the bearer control layer assigns a bearer path according to the service bandwidth request from a user, which is to specify the path information including the intermediate routers and interfaces in the bearer network through which the service flow is transferred; and then send the specified path through control signaling to the starting router in the bearer network.

For example, as illustrated in FIG. 2, the bearer control layer assigns the path E1→A→B→C→D→E2 to the service flow from the router E1 to the router E2, and sends this path information to the starting router E1.

Step B: the starting router E1 in the bearer network makes bandwidth reservation for the current service request of the user according to the explicit route signaling of MPLS, and establishes an end-to-end LSP.

Along with the path assigned by the bearer control layer through the routers E1, A, B, C, D and E2, an end-to-end LSP, i.e. the LSP from the router E1 to E2, has to be established among these routers in order to transfer the service flow from the router E1 to E2. The detailed description of the establishing process for the LSP is given as below. The starting router E1 determines the path from the router E1 to A for the LSP, and sends the path information containing a request for binding labels to the specific LSP to the transfer router A through the explicit route signaling of MPLS. The handling process of the sequent transfer routers, including A, B, C and D, is similar to the above process for establishing the LSP from the router E1 to E2. A label is distributed to the corresponding upstream router by each downstream router in the link when the link is established to form the end-to-end LSP. After the label switching path has been established between the routers D and E2 by means of a label being distributed to the router D by the router E2, the router D returns the information of the path established by itself to the router C, then the router C returns the information of the path established by itself and the router D to the router B, and such a process is repeated accordingly, and all the path information contains label information. Therefore, the starting router E1 finally obtains the complete LSP information including the label information of the end-to-end LSP.

Step C: when the service flow enters the starting router E1, the router E1 attaches the designated LSP label to this service flow. The service flow is forwarded through the end-to-end LSP established in Step B.

To be specific, every router through which this end-to-end LSP passes maintains the corresponding label information of the LSP, therefore every router may forward the service flow directly according to the label.

It can be seen from the above solution that the LSP is created or updated in the conventional bearer network for the service bandwidth request of a user by means of the explicit route signaling technique of MPLS according to the path assigned by the bearer control layer, and the service flow is forwarded in the bearer network through the LSP, therefore the service flow in the bearer network can be forwarded through the path assigned by the bearer control layer.

SUMMARY OF THE INVENTION

A method for realizing route forwarding in a network including a bearer control entity and a bearer network, includes:

establishing a plurality of Label Switching Paths (LSPs) in the bearer network, wherein each LSP includes a starting node and an ending node;

setting an entrance label pointing to the forwarding information of the LSP at the starting node of each LSP;

the bearer control entity assigning a transfer path comprising at least one LSP in the bearer network for a service flow to be transferred, wherein the transfer path includes an ingress edge node and an egress edge node;

the information of entrance labels corresponding to the LSPs that the transfer path comprises, in form of a label stack, being sent to the ingress edge node of the transfer path;

when forwarding the service flow, the ingress edge node which receives the label stack attaching the label stack to the data packet of the service flow to generate a Multiple Protocol Label Switching (MPLS) exchange packet; and forwarding the MPLS exchange packet along the transfer path according to the label stack until the MPLS exchange packet reaches the egress edge node of the transfer path.

DETAILED DESCRIPTION OF THE INVENTION

This invention is hereinafter described in detail with reference to the accompanying drawings and detailed embodiments.

Figure 1:
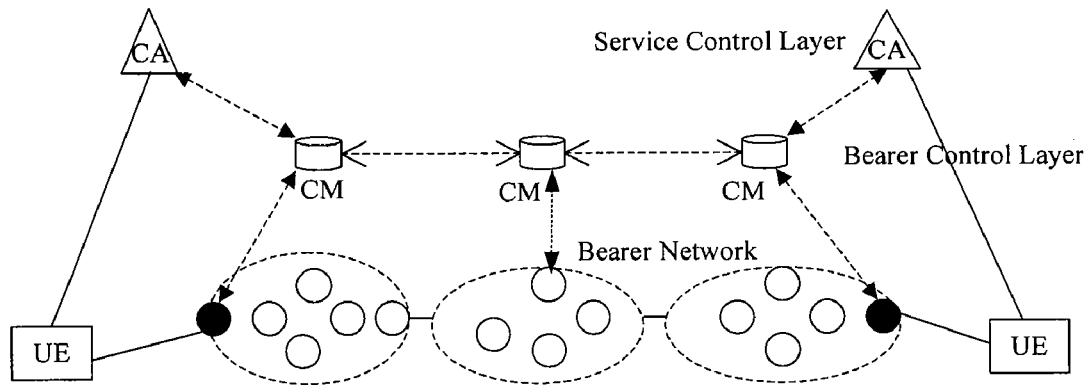
FIG. 1 is a schematic diagram illustrating a network model with an independent bearer control layer in the prior art.
Figure 2:
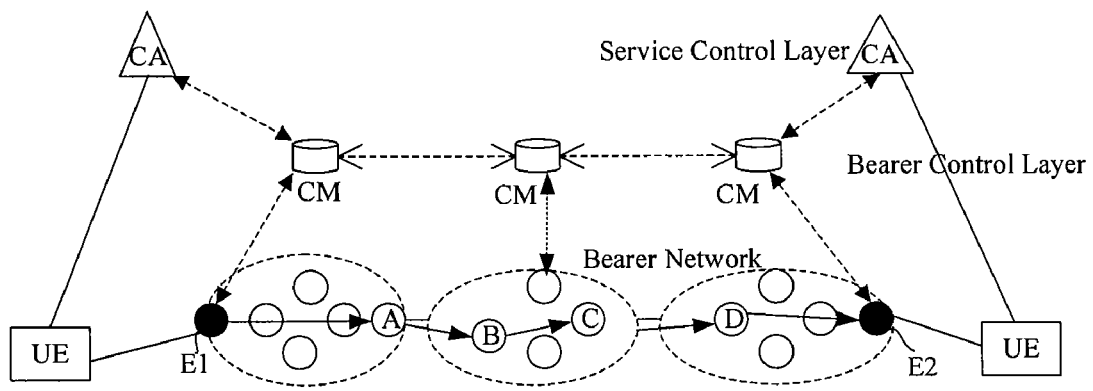
FIG. 2 is a schematic diagram illustrating the implementation of route forwarding through an assigned path by means of the MPLS explicit route technique in the prior art.
Figure 3:
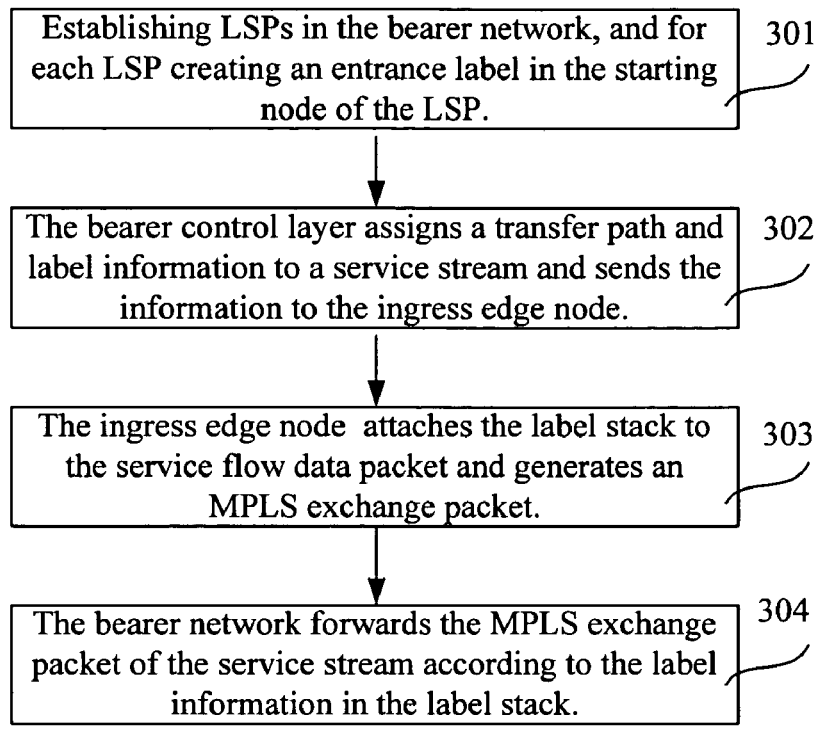
FIG. 3 is a flow chart of the solution in accordance with the embodiment of the present invention.

FIG. 3 illustrates the solution in accordance with the embodiments of the present invention, which includes the following steps:

Step 301: establishing LSPs in a bearer network; and setting an entrance label pointing to the forwarding information of the LSP at the starting node of each LSP.

Signaling such as RSVP-TE or CR-LSP in combination with the MPLS traffic engineering can be adopted to establish an LSP and configure the LSP statically, with the bandwidth and other QoS properties of the LSP reserved in advance. When an LSP is established, the corresponding label will be configured to each link that forms the LSP. A downstream-on-demand label distribution mode is usually adopted to configure these labels, which means that the label is usually distributed to the corresponding upstream node by the downstream node on the link.

In order to guarantee that the transfer node, which is employed to transfer or forward data packets, is able to forward the data packet to the next designated LSP after data packet passed through an LSP and the corresponding label is popped up, an entrance label for the LSP has to be set in the starting node of the LSP. Therefore a transfer node or an edge node is able to determine the forwarding information of the next LSP according to the entrance label, and forwards the data packet according to the labels of the next LSP.

Step 302: when a service flow needs to be transferred, the bearer control layer serving as the bearer control entity assigns a transfer path in the bearer network to the service flow and sends the corresponding entrance label information of every LSP through which the transfer path passes to the ingress edge node of the transfer path in the form of a label stack.

The ingress edge node is the first node in the bearer network that provides service for the service flow.

Step 303: when the ingress edge node forwards a service flow, the node attaches the label stack provided by the bearer control layer to the data packet of the service flow to be sent, generating an MPLS exchange packet of the service flow.

Step 304: the bearer network forwards the MPLS exchange packet of the service flow from the ingress edge node to the egress edge node of the transfer path according to the label information in the label stack.

The above steps are hereinafter described in details, respectively.

Figure 4:
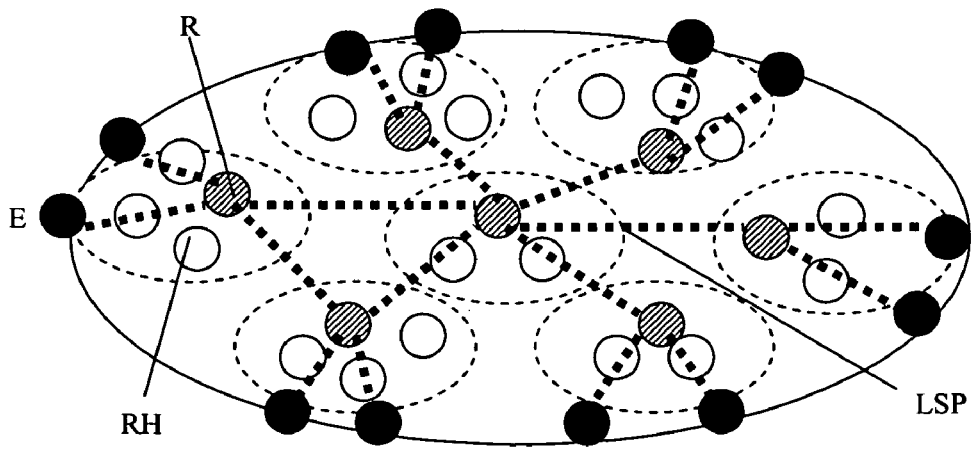
FIG. 4 is a schematic diagram illustrating a service bearer logical network established with MPLS technology in accordance with an embodiment of the present invention.

In Step 301, a bearer network as illustrated in FIG. 4 is established based on the MPLS technology. Every bearer domain of this bearer network consists of edge nodes, intermediate transfer nodes and logical links between the nodes. For an LSP in a bearer domain, the edge node through which the LSP passes is the edge router (E) in the bearer network; the intermediate transfer nodes can be some core routers (R) chosen from every bearer domain; the logical links between edge nodes and intermediate transfer nodes or between intermediate transfer nodes are LSPs established by means of the MPLS technology.

The establishing of each LSP is implemented as follows: the starting node of an LSP adopts and combines signaling such as RSVP-TE or CR-LSP with MPLS traffic engineering, configures the LSP statically, and reserves the bandwidth and other QoS properties of the LSP in advance. The bearer network can also be established by using the hierarchical MPLS technology, in other words, an LSP connection between the edge node and the intermediate transfer node can pass through some LSPs at a low logical hierarchy as well as through physical links of nodes. However, the LSPs at low logical hierarchies serve only as tunnel interfaces of the bearer network, and do not appear in the service logical bearer network. Therefore, only the LSP connections between edge nodes and intermediate transfer nodes and the LSP connections between intermediate transfer nodes need to be processed no matter what forms of MPLS technology is adopted by the bearer network to establish the bearer control layer, while the LSPs at lower logical hierarchies do not need to be processed.

The service flow logical bearer network established by using the MPLS technology is a relative static network, which simplifies the network design and the resource allocation by the bearer control layer, and is favorable for the stability of the network and the convenient maintenance thereof. The bearer network can be designed and maintained separately from the Internet service flow, and at the same time the service quality requirements of real time services can be met by such a bearer network.

Besides, an entrance label of LSP should be set by the starting node of each LSP when the LSP is established. To be specific, the starting node should create a corresponding label cross-connection item to determine the corresponding LSP according to the entrance label information. A label cross-connection item can be created through the following steps: saving the forwarding information of the corresponding LSP, which contains the label and the interface information of the LSP, in an item of the Next Hop Label Forwarding Entry (NHLFE) table of the node; setting an entrance label in the Input Label Mapping (ILM) table, and making the entrance label point to the NHLFE table item which stores the forwarding information of this LSP. In this way, the starting node of the LSP is able to find the corresponding LSP forwarding information according to the entrance label.

The entrance label set by each node can be a global label or a local label. When the entrance label is a global label, the entrance label is valid at every interface of the node, in other words, every interface can determine the forwarding information of the next LSP through the global label. Under such circumstances, to create a label cross-connection item is to set an entrance label in the public ILM, and make this entrance label point to the NHLFE table item which stores the forwarding information of the LSP.

When the entrance label is a local label, the entrance label is valid only at a specific interface. Under such circumstances, to create a label cross-connection item is to set an entrance label in the ILM corresponding to the specific interface. To be specific, it is needed to set up ILM tables that respectively correspond to each possible input interface in a transfer node, and set a table item that stores the LSP forwarding information in the NHLFE; then add an item in each ILM table corresponding to the possible input interfaces, i.e. allocate a new entrance label, and make the new entrance label point to the NHLFE table item which stores the forwarding information of the LSP. Then the forwarding information of the next LSP can be determined according to the local label in the label cross-connection item of the LSP, therefore the MPLS exchange packet inputted from a specific interface can be forwarded to the next assigned LSP through an MPLS standard forwarding procedure.

Figure 5:
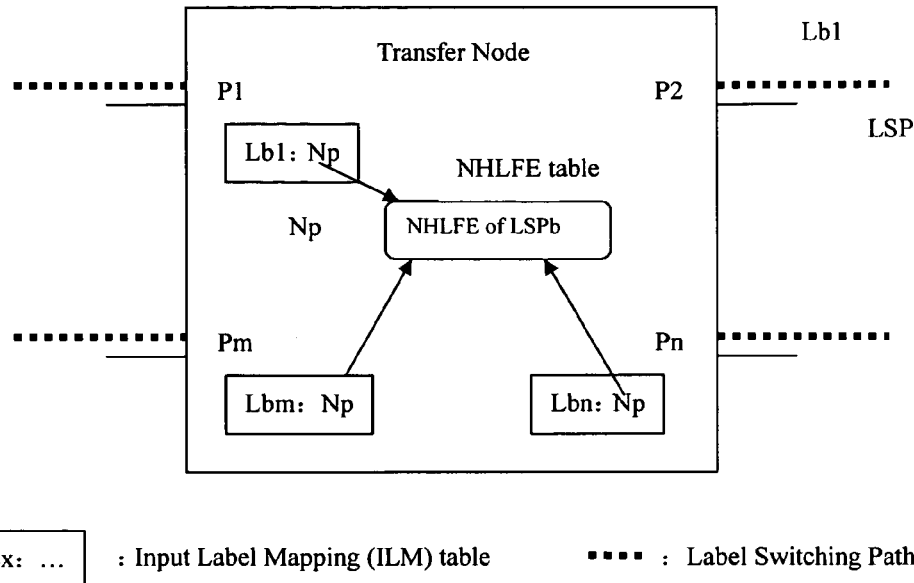
FIG. 5 is a schematic diagram illustrating a transfer router with multiple interfaces in accordance with an embodiment of the present invention.

The detailed process of creating a label cross-connection item in the local label mode is described hereinafter with reference to the example of a transfer node with multiple interfaces illustrated in FIG. 5. The transfer node is the starting node of LSPb. LSPb needs to start from the interface P2 of the transfer node, and uses a downstream-allocated label Lb in the transfer node, i.e., the label Lb is determined by the downstream node of LSPb. The $Np^{th}$ item of the NHLFE table of the transfer node stores the forwarding information of LSPb. In order to forward the MPLS exchange packet inputted from the interface P1 to LSPb, an item needs to be added to the ILM table of the interface P1, and the added entrance label is Lb1 which points to $Np^{th}$ item of the NHLFE table. Similarly, in order to forward the MPLS exchange packets inputted from the interfaces Pm and Pn to LSPb, an item needs to be added to the ILM tables of the interfaces Pm and Pn respectively and the newly allocated entrance labels are Lbm and Lbn, both of which point to the $Np^{th}$ item of the NHLFE table.

In Step 302, when the bearer control entity, i.e., the bearer control layer in this embodiment, reserves a path in the established service bearer network for the service flow and records the topology information of the bearer network and the corresponding entrance label information of every LSP, so the bearer control layer is able to determine all the corresponding entrance label information of the path in the bearer network and thus to form a label stack. The bearer control layer then sends the label stack to the ingress edge node of the service flow.

In Steps 303 and 304, the logical bearer network adopts the multi-level label stack mode of the MPLS technology to transfer the service flow. When the logical bearer network transfers the service flow, first, the edge node in the bearer network attaches the label stack designated by the bearer control layer to the service flow data packet to generate an MPLS exchange packet, then the service flow enters the bearer network through the edge node, and the MPLS exchange packet is sent from the edge node. The ingress edge node and sequent intermediate transfer nodes forward the MPLS exchange pack according to the LSPs. Each intermediate transfer node determines the forwarding information of the next LSP according to the top entrance label of the label stack, and forwards the MPLS exchange packet according to the forwarding information. When the MPLS exchange packet passes through a transfer node, the LSP through which the packet has just passed ends, the entrance label indicating the ending LSP in the label stack of the service flow will be popped out at the transfer node or at the penultimate hop node of the LSP; the node then continues to forward the service flow according to the entrance label of the next LSP in the label stack of the service flow, i.e. the top entrance label in the current label stack. Since the transfer nodes in the bearer network serve only as the ending or starting tandem points of LSPs, the transfer nodes only need the processing capability of supporting two-level label stacks.

The detailed process of transferring a service flow in a bearer network in Step 304 is described hereinafter with reference to the example of the bearer network illustrated in FIG. 6.

The bearer path assigned by the bearer control layer to the current service flow is: E1→LSPa→RA-LSPb→RB-LSPc→RC→LSPd→E2. The corresponding entrance labels of the LSPs in each of the transfer nodes through which the bearer path passes can be global labels or local labels. The nodes in the logical bearer network may be or may not be configured with a function of penultimate hop popping. If the nodes are configured with the function of penultimate hop popping, the penultimate hop node of an LSP will pop out the corresponding top entrance label of the LSP. For example, when the nodes through which LSPa passes are configured with the function of penultimate hop popping, the node prior to RA shall pop out the top entrance label corresponding to LSPa. If the nodes through which an LSP passes are not configured with the function of penultimate hop popping, the last hop node of the LSP shall pop up the top entrance label; taking LSPa as an example again, in such a situation, the corresponding top entrance label of LSPa shall be popped out by the node RA.

Figure 7:
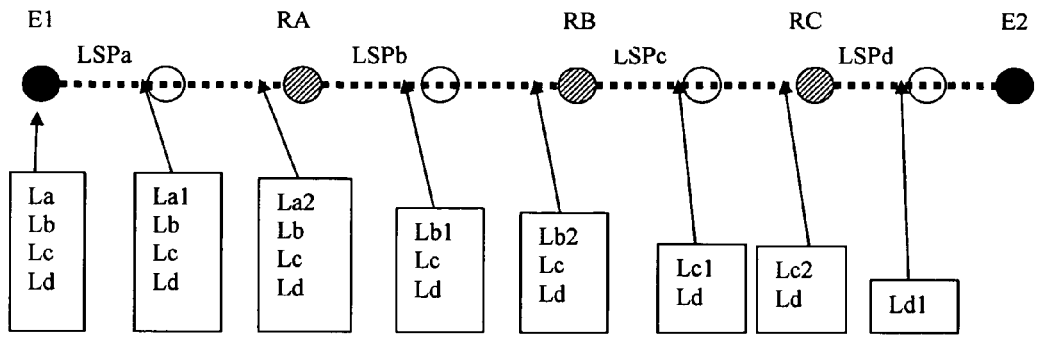
FIG. 7 is a schematic diagram illustrating a label configuration while the service flow is forwarded in the bearer network in accordance with an embodiment of the present invention.
Figure 8:
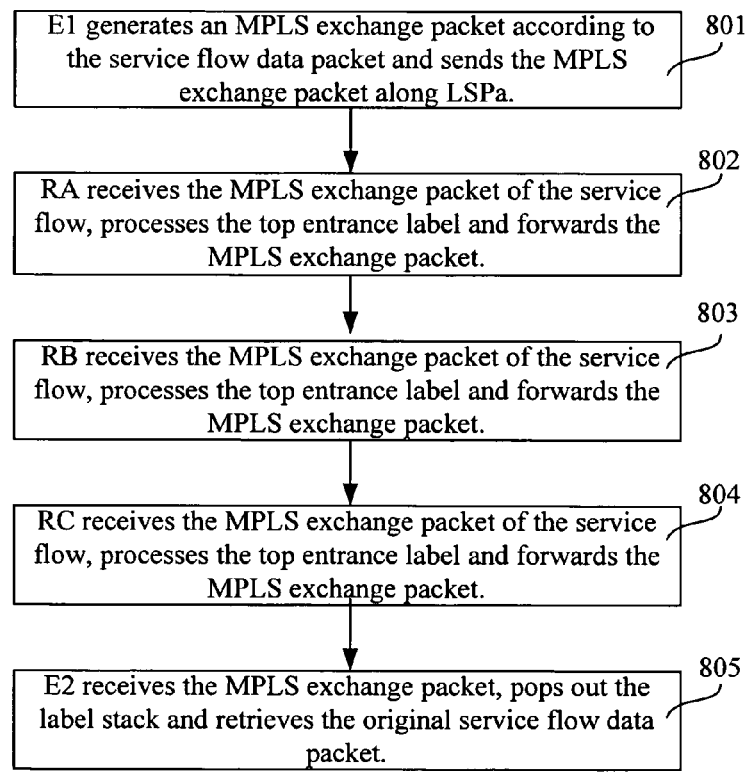
FIG. 8 is a flow chart of the service bearer logical network forwarding a service flow.

To be specific, if all the corresponding entrance labels of the current LSP in the nodes in the logical bearer network are global labels, for example, the global label of LSPa in E1 is La, the global label of LSPb in RA is Lb, the global label of LSPc in RB is Lc, the global label of LSPd in RC is Ld, then the corresponding MPLS label stack of the path LSPa→LSPb→LSPc→LSPd determined by the bearer control layer is La/Lb/Lc/Ld successively, and La is the top entrance label. If none of the nodes through which the path passes is configured with the function of penultimate hop popping, the label state of the MPLS forwarding process of the service flow in the bearer network is illustrated in FIG. 7. The detailed forwarding process of the service flow in the logic bearer network as illustrated in FIG. 8 includes the following steps:

Step 801: the service flow data packet reaches the node E1 first, and the node E1 attaches the label stack of La/Lb/Lc/Ld to this service flow data packet according to the command of the bearer control layer to form an MPLS exchange packet, with La being the top entrance label. Then the node E1 sends the MPLS exchange packet of this service flow according to the entrance label La.

The detailed process of the node E1 sending the MPLS exchange packet according to the entrance label La includes the following steps: first, E1 determines the forwarding information of LSPa according to the entrance label La, and acquires the label information of the LSP in the forwarding information; then E1 replaces the top entrance label La with a corresponding label of LSPa, and sends the MPLS exchange pack along LSPa according to the corresponding label.

LSPa may pass through several nodes in the bearer network, in other words, there may be other nodes between E1 and RA. However, these nodes are not the transfer nodes through which the service flow travels, so these nodes only forward the MPLS exchange packet according to the top entrance label of the label stack. The forwarding process of the MPLS exchange packet carried out by these nodes according to the top entrance label mainly includes: acquiring the label of the next link of the LSP, replacing the top entrance label with the acquired label, and forwarding the packet according to the new top entrance label, i.e. the acquired label. After the above process, when the MPLS exchange packet reaches the node RA, the top entrance label in the label stack is La2, as illustrated in FIG. 7.

Step 802: the transfer node RA receives the MPLS exchange packet of the service flow, conducts the top entrance label processing and forwards the MPLS exchange packet.

Since LSPa ends at the node RA, the node RA pops out the top entrance label La2, and forwards the packet according to the second-level entrance label Lb. While forwarding the packet, the node RA also determines the forwarding information of LSPb according to the entrance label Lb, and acquires the label information of this LSP in the forwarding information. Suppose that the label is Lb1, then the node RA replaces the entrance label Lb on the top of the label stack with a new corresponding label of LSPb, and forwards the MPLS exchange pack along LSPb according to the new corresponding label of LSPb. That is to say, the MPLS exchange packet of the service flow is forwarded by the transfer node RA along LSPb, and at this time the label stack has reduced one level and become the configuration of Lb1/Lc/Ld.

Likewise, LSPb may pass through several nodes which are not the transfer nodes and only forward the MPLS exchange pack according to the current top entrance label of the label stack.

Step 803: the transfer node RB receives the MPLS exchange packet of the service flow, conducts the top entrance label processing and forwards the MPLS exchange packet.

Step 804: the transfer node RC receives the MPLS exchange packet of the service flow, conducts the top entrance label processing and forwards the MPLS exchange packet.

The processes performed by the nodes RB and RC are similar to the handling process of the node RA. After the handling processes, the MPLS exchange packet of the service flow is forwarded by the node RB along LSPc with the label stack reduced to Lc1/Ld, and then forwarded by the node RC along LSPd with the label stack reduced to Ld1.

Step 805: when the MPLS exchange packet reaches the node E2 through LSPd, as LSPd ends at the node E2, the node E2 pops out the label stack and retrieves the original service flow data packet.

Figure 9:
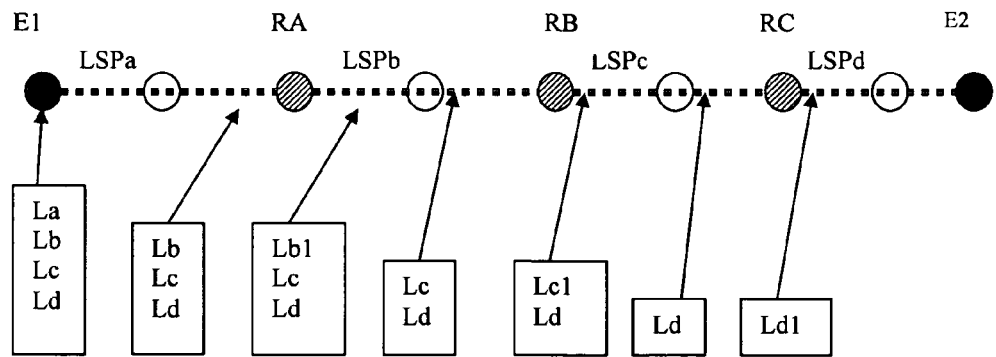
FIG. 9 is a schematic diagram illustrating a label state while the service flow is forwarded in the bearer network with the popping function at the last but one hop in accordance with an embodiment of the present invention.

The above process is carried out under the circumstances that the entrance labels of the nodes are global labels and the nodes are not configured with the function of penultimate hop popping. When the entrance labels of the nodes are global labels, if the nodes through which the path passes are configured with the function of penultimate hop popping, the penultimate hop node of each LSP shall pop out the label while forwarding the service flow by means of MPLS in the bearer network. Under such circumstances, the label state while the MPLS exchange packet of the service flow is forwarded in the bearer network is illustrated in FIG. 9.

The corresponding entrance labels of the current LSP in the nodes may also be local labels. Under such circumstances, i.e. after different local labels for different input interfaces are configured in advance for the starting transfer nodes of every LSP, the bearer control layer can determine the forwarding label stack according to the path of the service flow. In other words, the bearer control layer pushes successively into the label stack the entrance labels configured in the ILM tables of the input interfaces of the service path by the starting transfer nodes of each LSP. To be specific, suppose all the corresponding transfer nodes of the LSP in this embodiment adopt local labels. For example, the transfer node RA assigns the entrance label Lb1 to LSPb at the input interface of LSPa, the transfer node RB assigns the entrance label Lc1 to LSPc at the input interface of LSPb, the transfer node RC assigns the entrance label Ld1 to LSPd at the input interface of LSPc, then the bearer control layer successively pushes the entrance label of each LSP forming the path into the label stack according to the calculation principle of the label stack, and determines the MPLS label stack of the service flow to be forwarded through the path LSPa→LSPb→LSPc→LSPd is La/Lb1/Lc1/Ld1, wherein La is the top entrance label.

Figure 6:
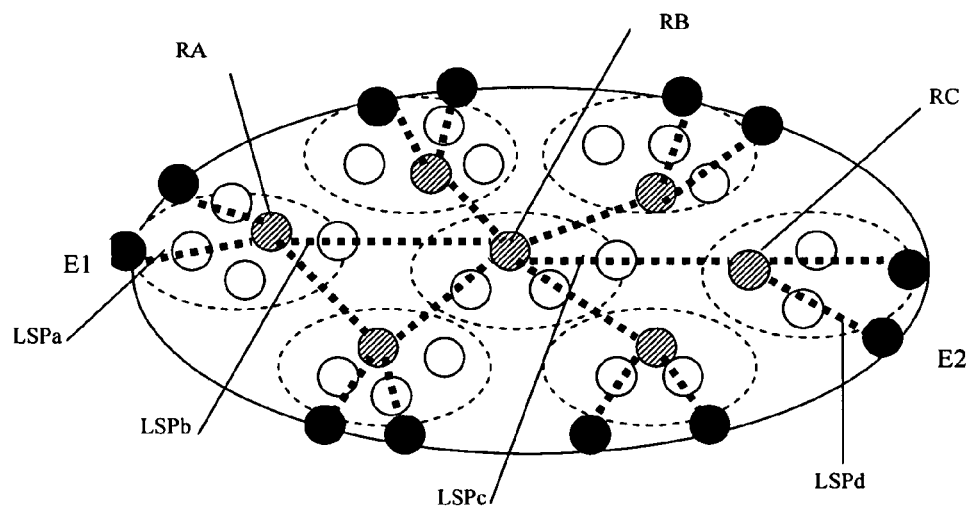
FIG. 6 is a schematic diagram illustrating a service bearer network in accordance with an embodiment of the present invention.
Figure 10:
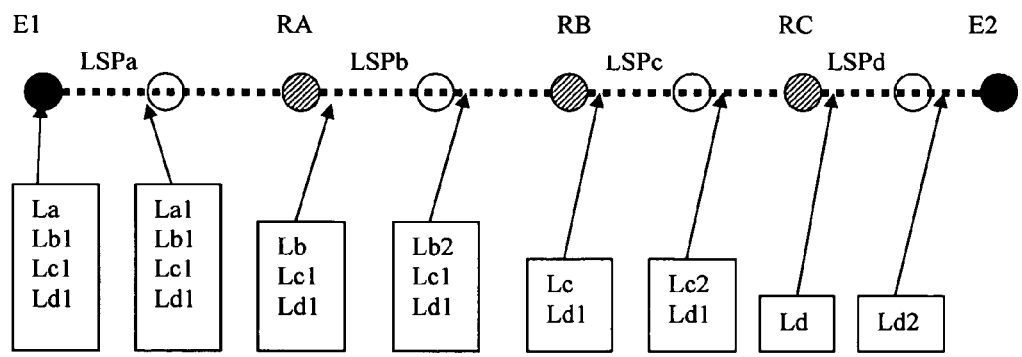
FIG. 10 is a schematic diagram illustrating the label state while the service flow is forwarded in the bearer network in accordance with an embodiment of the present invention.
Figure 11:
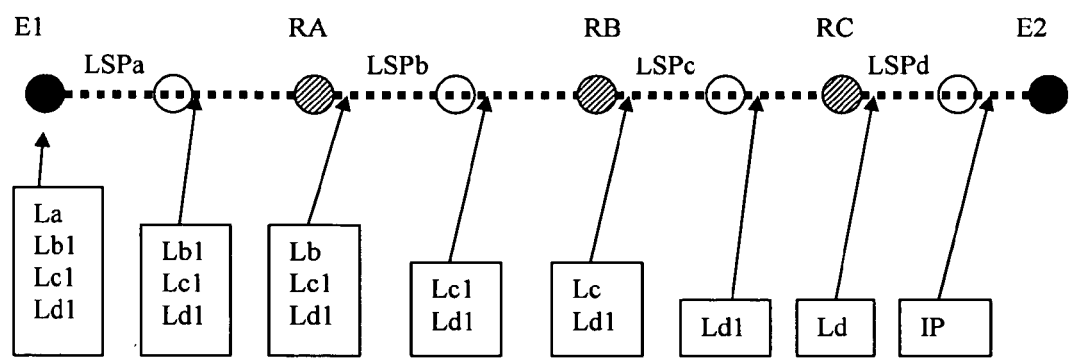
FIG. 11 is a schematic diagram illustrating a label state while the service flow is forwarded in the bearer network with the popping function at the last but one hop in accordance with another embodiment of the present invention.

Thus, in the case that there are LSPs adopting local interface labels in the path designated by the bearer control layer, and that the bearer network is not configured with the function of penultimate hop popping, the label state in the MPLS forwarding process of the service flow in the bearer network illustrated in FIG. 6 is shown in FIG. 10. The detailed forwarding process of the service flow in the logical bearer network is similar to the process when global labels are adopted, which is illustrated in FIG. 8. The difference is that, if global labels are adopted, the node only needs to acquire the corresponding LSP forwarding information from its own public ILM table; if local labels are adopted, the node has to acquire the corresponding LSP forwarding information from the ILM table corresponding to the interface from which the MPLS exchange packet is currently received. In addition, FIG. 8 illustrates the forwarding process when the bearer network is not configured with the function of penultimate hop popping. If the corresponding node of the current LSP in the bearer network is configured with the function of penultimate hop popping, the penultimate node prior to the ending node of each LSP shall pop out the top entrance label. The local label state in the MPLS forwarding process of the service flow in the bearer network illustrated in FIG. 6 is illustrated in FIG. 11.

The foregoing description is only preferred embodiments of this invention and is not to be used to limit the protection scope of the present invention, various changes and modifications can be made without departing from the spirit of the invention and therefore shall be covered by the protection scope as set up by the appended claims.

What is claimed is:

1. A method for realizing route forwarding in a network including a bearer control entity and a bearer network, comprising:

establishing a plurality of Label Switching Paths (LSPs) in the bearer network, wherein each LSP comprises a starting node and an ending node;

setting an entrance label pointing to the forwarding information of the LSP at the starting node of each LSP;

assigning, by the bearer control entity, a transfer path comprising at least one LSP in the bearer network for a service flow to be transferred, wherein the transfer path comprises an ingress edge node and an egress edge node;

wherein the information of entrance labels corresponding to all of the LSPs that the transfer path comprises, in form of a label stack, being sent to the ingress edge node of the transfer path;

when forwarding the service flow, the ingress edge node which receives the label stack attaching the label stack to the data packet of the service flow to generate a Multiple Protocol Label Switching (MPLS) exchange packet; and forwarding the MPLS exchange packet along the transfer path according to the label stack until the MPLS exchange packet reaches the egress edge node of the transfer path;

wherein the step of establishing LSPs in the bearer network comprises: establishing the LSPs based on the hierarchical MPLS technology.

2. The method according to claim 1, wherein the step of setting an entrance label pointing to the forward information of the LSP at the starting node of each LSP comprises:

saving the forward information of the LSP in an item of a Next Hop Label Forwarding Entry (NHLFE) table of the starting node, creating the entrance label in an Input Label Mapping (ILM) table, and making the entrance label point to the NHLFE table item which stores the forwarding information of the LSP.

3. The method according to claim 2, wherein the entrance label is a global label; and the ILM table is a public ILM table of the starting node.

4. The method according to claim 2, wherein the entrance label is a local label; and the ILM table is corresponding to the ingress interface of the starting node from which the MPLS exchange packet is inputted.

5. The method according to claim 2, wherein the step of forwarding the MPLS exchange packet in the bearer network according to the label stack comprises:

the starting node of each LSP of the transfer path in turn acquiring the top entrance label from the label stack in the MPLS exchange packet, determining the NHLFE table item corresponding to the entrance label according to the ILM table, acquiring the forwarding information of the LSP in the NHLFE table item, and forwarding the MPLS exchange packet according to the forwarding information of the LSP;

a node of the LSP popping out the top entrance label of the label stack in the MPLS exchange packet; the ending node of the LSP determining the NHLFE table item corresponding to the top entrance label according to the top entrance label of the label stack in the MPLS exchange packet and the ILM table, acquiring the forwarding information of the LSP in the NHLFE table item, and forwarding the MPLS exchange packet according to the forwarding information of the LSP; and the egress edge node of the transfer path, which has received the MPLS exchange packet, popping out the label stack of the MPLS exchange packet, and retrieving the original data packet of the service flow.

6. The method according to claim 5, wherein the node that pops out the top entrance label of the label stack in the MPLS exchange packet is the ending node of the LSP.

7. A method for realizing route forwarding in a network including a bearer control entity and a bearer network, comprising:

establishing a plurality of Label Switching Paths (LSPs) in the bearer network, wherein each LSP comprises a starting node and an ending node;

setting an entrance label pointing to the forwarding information of the LSP at the starting node of each LSP;

the bearer control entity assigning a transfer path comprising at least one LSP in the bearer network for a service flow to be transferred, wherein the transfer path comprises an ingress edge node and an egress edge node;

the information of entrance labels corresponding to the LSPs that the transfer path comprises, in form of a label stack, being sent to the ingress edge node of the transfer path;

when forwarding the service flow, the ingress edge node which receives the label stack attaching the label stack to the data packet of the service flow to generate a Multiple Protocol Label Switching (MPLS) exchange packet; and forwarding the MPLS exchange packet along the transfer path according to the label stack until the MPLS exchange packet reaches the egress edge node of the transfer path;

wherein the step of setting an entrance label pointing to the forward information of the LSP at the starting node of each LSP comprises:

saving the forward information of the LSP in an item of a Next Hop Label Forwarding Entry (NHLFE) table of the starting node, creating the entrance label in an Input Label Mapping (ILM) table, and making the entrance label point to the NHLFE table item which stores the forwarding information of the LSP;

wherein the step of forwarding the MPLS exchange packet in the bearer network according to the label stack comprises:

the starting node of each LSP of the transfer path in turn acquiring the top entrance label from the label stack in the MPLS exchange packet, determining the NHLFE table item corresponding to the entrance label according to the ILM table, acquiring the forwarding information of the LSP in the NHLFE table item, and forwarding the MPLS exchange packet according to the forwarding information of the LSP;

a node of the LSP popping out the top entrance label of the label stack in the MPLS exchange packet; the ending node of the LSP determining the NHLFE table item corresponding to the top entrance label according to the top entrance label of the label stack in the MPLS exchange packet and the ILM table, acquiring the forwarding information of the LSP in the NHLFE table item, and forwarding the MPLS exchange packet according to the forwarding information of the LSP;

the egress edge node of the transfer path, which has received the MPLS exchange packet, popping out the label stack of the MPLS exchange packet, and retrieving the original data packet of the service flow; and configuring in the routers of the bearer network a function of penultimate hop popping;

wherein the node that pops out the top entrance label of the label stack in the MPLS exchange packet is the penultimate hop node of the LSP.

* * * * *